(12) United States Patent
Kudo et al.

(10) Patent No.: US 11,516,515 B2
(45) Date of Patent: Nov. 29, 2022

(54) IMAGE PROCESSING APPARATUS, IMAGE PROCESSING METHOD AND IMAGE PROCESSING PROGRAM

(71) Applicant: NIPPON TELEGRAPH AND TELEPHONE CORPORATION, Tokyo (JP)

(72) Inventors: Shinobu Kudo, Tokyo (JP); Shota Orihashi, Tokyo (JP); Masaki Kitahara, Tokyo (JP); Atsushi Shimizu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/273,366

(22) PCT Filed: Sep. 11, 2019

(86) PCT No.: PCT/JP2019/035631
§ 371 (c)(1),
(2) Date: Mar. 4, 2021

(87) PCT Pub. No.: WO2020/059581
PCT Pub. Date: Mar. 26, 2020

(65) Prior Publication Data
US 2021/0344967 A1    Nov. 4, 2021

(30) Foreign Application Priority Data
Sep. 19, 2018    (JP) .............................. JP2018-174982

(51) Int. Cl.
*H04N 19/85* (2014.01)
*H04N 19/80* (2014.01)
*H04N 19/91* (2014.01)

(52) U.S. Cl.
CPC .............. *H04N 19/85* (2014.11); *H04N 19/80* (2014.11); *H04N 19/91* (2014.11)

(58) Field of Classification Search
CPC ......... H04N 19/85; H04N 19/91; H04N 19/80
See application file for complete search history.

(56) References Cited

U.S. PATENT DOCUMENTS

| 6,226,326 B1 * | 5/2001 | Mihara ................ H04N 19/146 |
| | | 375/E7.181 |
| 2002/0085740 A1 * | 7/2002 | Asano ........................ G06T 7/20 |
| | | 382/254 |

(Continued)

OTHER PUBLICATIONS

Nitish Srivastava et al., Unsupervised Learning of Video Representations using LSTMs, arXiv, 2016.

*Primary Examiner* — Shawn S An
(74) *Attorney, Agent, or Firm* — Harness, Dickey & Pierce, P.L.C.

(57) ABSTRACT

An image processing apparatus for performing correction for each frame group including a predetermined number of frames into which video data is divided includes a decoding unit configured to obtain a corrected frame group by correcting a second frame group, which is a frame group continuous with a first frame group in time, using a feature quantity of the first frame group. The decoding unit performs the correction so that subjective image quality based on a relationship between the second frame group and a frame group subsequent to the second frame group in time is increased and so that a predetermined classifier classifies that a frame group in which the second frame group is concatenated with the frame group subsequent to the second frame group in time is the same as a frame group in which the corrected frame group is concatenated with a corrected frame group obtained by correcting the frame group subsequent to the second frame group in time.

6 Claims, 14 Drawing Sheets

(56) References Cited

U.S. PATENT DOCUMENTS

| | | | |
|---|---|---|---|
| 2005/0207669 A1* | 9/2005 | Kameyama | G06T 5/50 |
| | | | 382/168 |
| 2006/0050975 A1* | 3/2006 | Ito | H04N 19/124 |
| | | | 375/E7.139 |
| 2006/0133770 A1* | 6/2006 | Shibata | H04N 9/8042 |
| | | | 386/356 |
| 2007/0098255 A1* | 5/2007 | Yokono | G06K 9/6256 |
| | | | 382/159 |
| 2008/0002771 A1* | 1/2008 | Chen | H04N 19/139 |
| | | | 375/E7.146 |
| 2009/0263032 A1* | 10/2009 | Tanaka | H04N 19/80 |
| | | | 382/233 |
| 2012/0050763 A1* | 3/2012 | Takeishi | H04N 1/642 |
| | | | 358/1.9 |
| 2016/0179356 A1* | 6/2016 | Baghadady | G06F 3/04842 |
| | | | 715/720 |
| 2017/0039485 A1* | 2/2017 | Kadav | G06F 9/5083 |
| 2018/0330258 A1* | 11/2018 | Harris | G06N 5/022 |
| 2019/0306526 A1* | 10/2019 | Cho | G06N 20/00 |
| 2020/0007877 A1* | 1/2020 | Zhou | H04N 19/426 |
| 2020/0381125 A1* | 12/2020 | Hao | G16H 50/50 |
| 2020/0410614 A1* | 12/2020 | Bonageri | G06N 20/20 |
| 2021/0014872 A1* | 1/2021 | Sankaran | G06N 20/00 |

* cited by examiner

IMAGE PROCESSING APPARATUS, IMAGE PROCESSING METHOD AND IMAGE PROCESSING PROGRAM

CROSS-REFERENCE TO RELATED APPLICATIONS

This application is a 371 U.S. National Phase of International Application No. PCT/JP2019/035631 filed on Sep. 11, 2019, which claims priority to Japanese Application No. 2018-174982 filed on Sep. 19, 2018. The entire disclosures of the above applications are incorporated herein by reference.

TECHNICAL FIELD

The present invention relates to an image processing apparatus, an image processing method and an image processing program.

Priority is claimed on Japanese Patent Application No. 2018-174982, filed Sep. 19, 2018, the content of which is incorporated herein by reference.

BACKGROUND ART

As one method of encoding an image, there is a method using an autoencoder. The image used here includes a still image and a moving image (hereinafter referred to as a "video"). The autoencoder is a three-layer neural network including an input layer (an encoder), a hidden layer, and an output layer (a decoder). The autoencoder is designed so that the encoder encodes input data into encoded data and the decoder restores the input data from the encoded data. The encoder and the decoder are constructed by any operator. For example, when the input data is an image, the encoder is constructed by a plurality of operators that perform a convolution operation and the decoder is constructed by a plurality of operators that perform an inverse operation which is the inverse of the convolution operation of the encoder.

In the operation of the neural network, representation capability and performance are expected to be improved by increasing the number of parameters. However, when the input data is, for example, a high-resolution image, a capacity of a memory required for the operation significantly increases as the number of parameters increases. Thus, it is not realistic to improve representation capability and performance by increasing the number of parameters.

Therefore, for example, as shown in FIG. 14, a method of dividing input data into a plurality of data elements having a size with which an operation is possible, performing an operation process of the neural network on each element of the divided data by a neural network, concatenating output decoded data, and restoring original input data is conceivable. However, in this method, elements of the divided data are processed independently of each other. Thus, in this method, the restored input data is likely to be an unnatural image because continuity with adjacent decoded data is not maintained, especially at a boundary portion of a divided image.

On the other hand, for example, as shown in FIG. 15, there is conventional technology for recursively inputting nearby decoded data to an encoder, a decoder, or both together with processing target data. By recursively inputting the nearby decoded data as described above, the continuity between the processing target data and the nearby decoded data is taken into consideration and more natural restored data can be obtained.

CITATION LIST

Non-Patent Literature

Non-Patent Literature 1

Nitish Srivastava et al., "Unsupervised Learning of Video Representations using LSTMs," arXiv, 2016.

SUMMARY OF INVENTION

Technical Problem

However, the above-described conventional technology has a problem of lacking random accessibility. The random accessibility used here is a property that desired data can be easily obtained even if the data is accessed discretely. In the conventional technology, for example, when the input data is video data, encoding and decoding are performed sequentially from the beginning of the video data. In this case, for example, even if only decoded data at a desired position of the video data is desired to be obtained, the decoded data at the desired position cannot be obtained unless the decoding is performed sequentially from the beginning of the video data.

Also, the above-described conventional technology has a problem of lacking parallelism. In the conventional technology, it is difficult to perform a parallel process because the operation process is performed recursively. Thus, in the conventional technology, it is difficult to efficiently perform the operation process using a distributed processing system or the like.

The present invention has been made in view of such a situation and an objective of the present invention is to provide technology for enabling encoding and decoding having random accessibility and parallelism to be performed on image data.

Solution to Problem

According to an aspect of the present invention, there is provided an image processing apparatus for performing correction for each frame group including a predetermined number of frames into which video data is divided, the image processing apparatus including: a decoding unit configured to obtain a corrected frame group by correcting a second frame group, which is a frame group continuous with a first frame group in time, using a feature quantity of the first frame group, wherein the decoding unit performs the correction so that subjective image quality based on a relationship between the second frame group and a frame group subsequent to the second frame group in time is increased and so that a predetermined classifier classifies that a frame group in which the second frame group is concatenated with the frame group subsequent to the second frame group in time is the same as a frame group in which the corrected frame group is concatenated with a corrected frame group obtained by correcting the frame group subsequent to the second frame group in time.

Also, according to an aspect of the present invention, in the above-described image processing apparatus, the decoding unit increases a weight in the correction in proportion to a feature quantity of a frame subsequent to the second frame group in time.

Also, according to an aspect of the present invention, there is provided an image processing apparatus for performing correction for each frame group including a predetermined number of frames into which video data is divided, the image processing apparatus including: a decoding unit configured to obtain a corrected frame group by correcting a second frame group using a feature quantity of a first frame group, which is a frame group previous to the second frame group in time and continuous with the second frame group in time, and a feature quantity of a third frame group, which is a frame group subsequent to the second frame group in time and continuous with the second frame group in time, wherein the decoding unit performs the correction so that subjective image quality based on a relationship between the corrected frame group and the first frame group and a relationship between the corrected frame group and the third frame group increases.

Also, according to an aspect of the present invention, in the above-described image processing apparatus, the decoding unit performs the correction on the basis of a parameter value updated in a learning process based on frame groups into which video data different from the video data is divided.

Also, according to an aspect of the present invention, in the above-described image processing apparatus, the learning process includes steps of: acquiring sample data including at least three frame groups which are continuous in time; inputting the sample data to a first learning model and obtaining feature quantities of the frame groups; inputting the feature quantities of the frame groups to a second learning model and obtaining corrected frame groups corresponding to the frame groups; calculating a loss value on the basis of the sample data, the feature quantities of the frame groups, the corrected frame groups, and a predetermined loss function; and updating the parameter value using the loss value.

Also, according to an aspect of the present invention, there is provided an image processing apparatus for performing correction for each partial data group including a predetermined number of partial data elements into which data are divided, the image processing apparatus including: a decoding unit configured to obtain a corrected partial data group by correcting a second partial data group, which is a partial data group continuous with a first partial data group in time, using a feature quantity of the first partial data group, wherein the decoding unit performs the correction so that subjective image quality based on a relationship between the second partial data group and a partial data group subsequent to the second partial data group in time is increased and so that a predetermined classifier classifies that a partial data group in which the second partial data group is concatenated with the partial data group subsequent to the second partial data group in time is the same as a partial data group in which the corrected partial data group is concatenated with a corrected partial data group obtained by correcting the partial data group subsequent to the second partial data group in time.

Also, according to an aspect of the present invention, there is provided an image processing method of performing correction for each frame group including a predetermined number of frames into which video data is divided, the image processing method including steps of: obtaining a corrected frame group by correcting a second frame group, which is a frame group continuous with a first frame group in time, using a feature quantity of the first frame group; and performing the correction so that subjective image quality based on a relationship between the second frame group and a frame group subsequent to the second frame group in time is increased and so that a predetermined classifier classifies that a frame group in which the second frame group is concatenated with the frame group subsequent to the second frame group in time is the same as a frame group in which the corrected frame group is concatenated with a corrected frame group obtained by correcting the frame group subsequent to the second frame group in time.

Also, according to an aspect of the present invention, there is provided an image processing program for causing a computer to function as the above-described image processing apparatus.

Advantageous Effects of Invention

According to the present invention, it is possible to perform encoding and decoding having random accessibility and parallelism with respect to image data.

DESCRIPTION OF EMBODIMENTS

First Embodiment

Hereinafter, a first embodiment of the present invention will be described with reference to the drawings.

Hereinafter, a video encoding/decoding system 1 that encodes and decodes video data will be described. However, the system can be applied to encode and decode image data as well as the video data.

Configuration of Video Encoding/Decoding System

A configuration of the video encoding/decoding system 1 will be described below.

Figure 1:
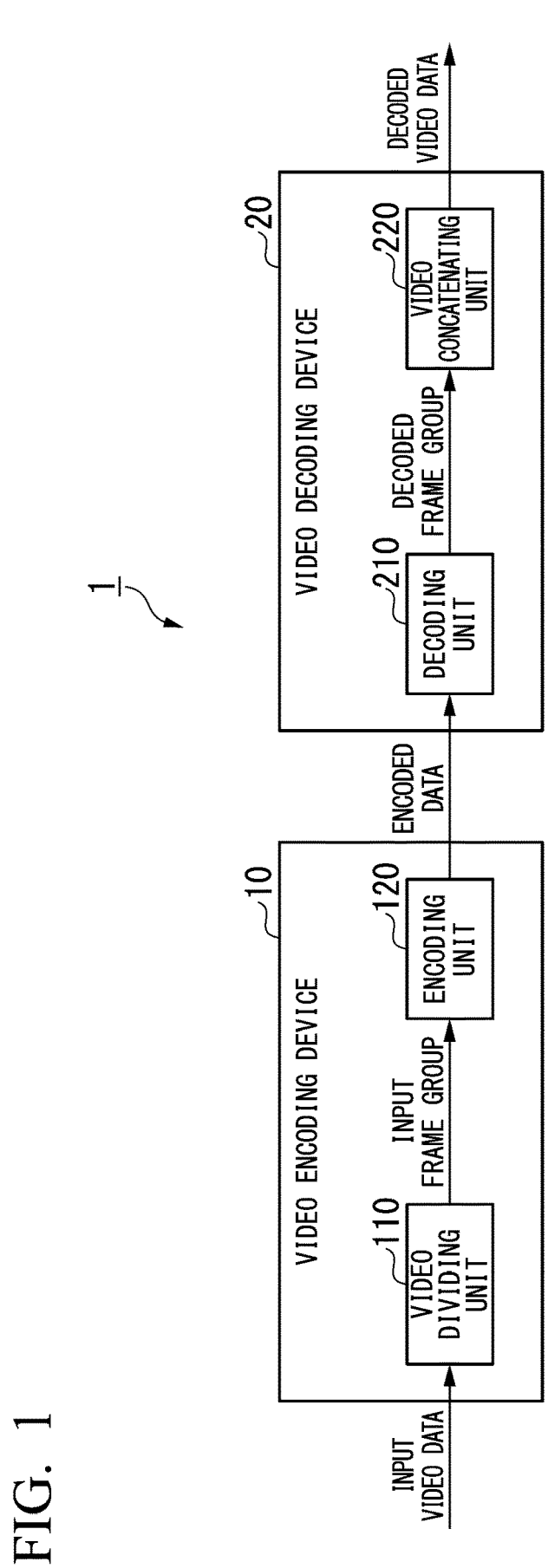
FIG. 1 is an overall configuration diagram of a video encoding/decoding system 1 according to the first embodiment.

FIG. 1 is an overall configuration diagram of the video encoding/decoding system 1 (an image processing apparatus) according to the first embodiment. As shown in FIG. 1, the video encoding/decoding system 1 acquires input video data serving as an encoding target and outputs decoded video data corresponding to the input video data. The video encoding/decoding system 1 is configured to include a video encoding device 10 and a video decoding device 20.

The video encoding device 10 is configured to include a video dividing unit 110 and an encoding unit 120. The video dividing unit 110 acquires the input video data. The input video data includes a plurality of frames which are continuous in time. The video dividing unit 110 generates a plurality of input frame groups by dividing a plurality of continuous frames constituting the acquired input video data in units of a predetermined number of frames. The video dividing unit 110 sequentially outputs the plurality of input frame groups that have been generated to the encoding unit 120.

Figure 2:
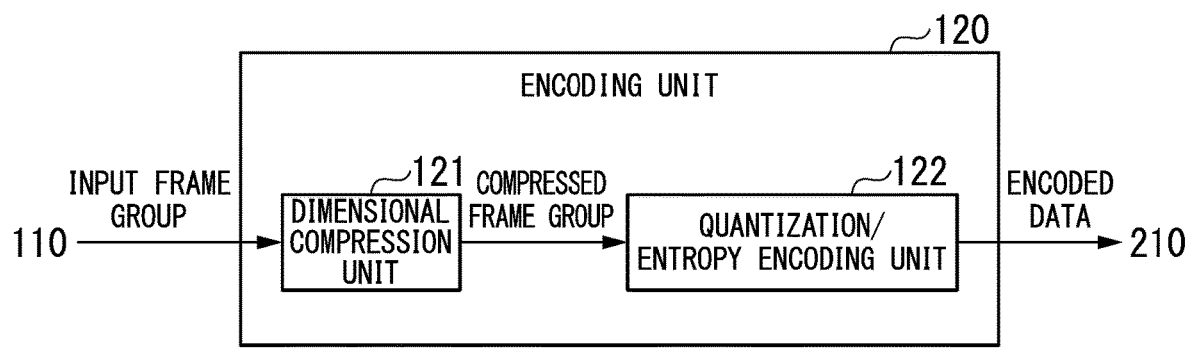
FIG. 2 is a configuration diagram of an encoding unit 120 of the video encoding/decoding system 1 according to the first embodiment.

The configuration of the encoding unit 120 is shown in FIG. 2. As shown in FIG. 2, the encoding unit 120 includes a dimensional compression unit 121 and a quantization/entropy encoding unit 122.

The dimensional compression unit 121 acquires an input frame group output from the video dividing unit 110. The dimensional compression unit 121 generates a compressed frame group by compressing the acquired input frame group so that the number of dimensions is reduced. The dimensional compression unit 121 outputs the generated compressed frame group to the quantization/entropy encoding unit 122.

The quantization/entropy encoding unit 122 acquires the compressed frame group output from the dimensional compression unit 121. The quantization/entropy encoding unit 122 performs quantization and entropy encoding on values of compressed frames constituting the acquired compressed frame group. The quantization/entropy encoding unit 122 generates encoded data by concatenating quantized and entropy-encoded compressed frames. The quantization/entropy encoding unit 122 outputs the generated encoded data to the decoding unit 210 of the video decoding device 20 to be described below.

The description will be given with reference again to FIG. 1.

The video decoding device 20 is configured to include a decoding unit 210 and a video concatenating unit 220.

Figure 3:
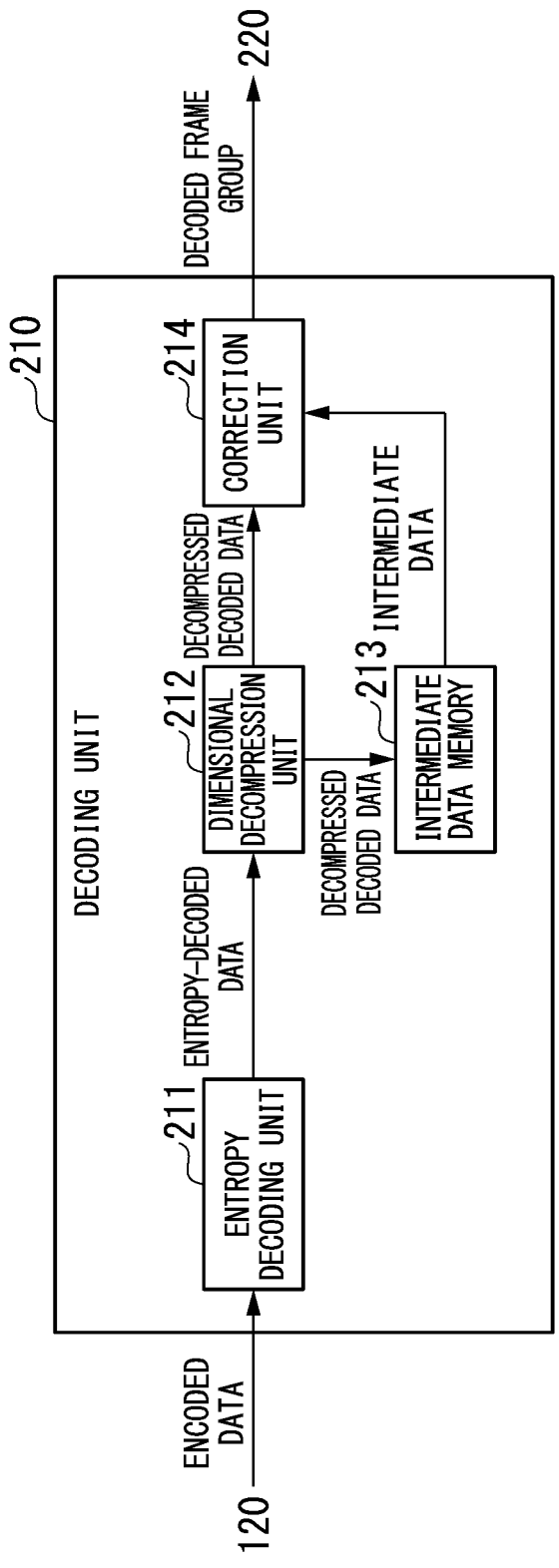
FIG. 3 is a configuration diagram of a decoding unit 210 of the video encoding/decoding system 1 according to the first embodiment.

The configuration of the decoding unit 210 is shown in FIG. 3. As shown in FIG. 3, the decoding unit 210 is configured to include an entropy decoding unit 211, a dimensional decompression unit 212, an intermediate data memory 213, and a correction unit 214.

The entropy decoding unit 211 acquires the encoded data output from the quantization/entropy encoding unit 122 of the encoding unit 120. The entropy decoding unit 211 generates entropy-decoded data by performing entropy decoding on the acquired encoded data. The entropy decoding unit 211 outputs the generated entropy-decoded data to the dimensional decompression unit 212.

The dimensional decompression unit 212 generates decompressed decoded data by decompressing the entropy-decoded data output from the entropy decoding unit 211 until the number of dimensions is the same as that of the above-described input frame group (before the compression of the dimensional compression unit 121). The dimensional decompression unit 212 outputs the generated decompressed decoded data to the intermediate data memory 213 and the correction unit 214.

The intermediate data memory 213 acquires and stores the decompressed decoded data output from the dimensional decompression unit 212. The decompressed decoded data stored in the intermediate data memory 213 is hereinafter referred to as "intermediate data". The intermediate data is output to the correction unit 214 as needed. The intermediate data memory 213 is a volatile recording medium such as a random access memory (RAM) (a readable and writable memory).

The correction unit 214 acquires the decompressed decoded data output from the dimensional decompression unit 212. Also, the correction unit 214 acquires the intermediate data stored in the intermediate data memory 213. The correction unit 214 generates decoded frame groups by correcting the decompressed decoded data using the intermediate data. The correction unit 214 outputs the generated decoded frame groups to the video concatenating unit 220.

The description will be given with reference again to FIG. 1.

The video concatenating unit 220 acquires the decoded frame groups output from the decoding unit 210. The video concatenating unit 220 generates decoded video data by concatenating the acquired decoded frame groups. The video concatenating unit 220 outputs the generated decoded video data as final output data.

Figure 4:
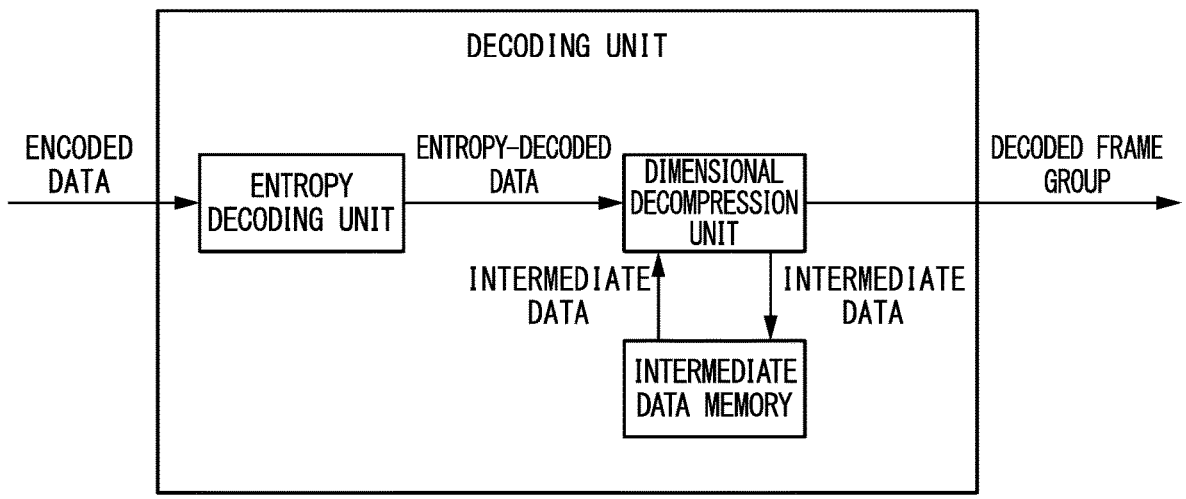
FIG. 4 is a configuration diagram of a decoding unit of a video encoding/decoding system according to conventional technology.

Also, for the description of a difference from the conventional technology, the configuration of the decoding unit 210 of the video encoding/decoding system in the conventional technology is shown in FIG. 4. As shown in FIGS. 3 and 4, the difference between the configuration of the decoding unit 210 according to the above-described first embodiment and the configuration of the decoding unit in the conventional technology is that the decoding unit in the conventional technology does not have a correction unit and the decoding unit 210 according to the first embodiment includes the correction unit 214.

The dimensional decompression unit of the decoding unit according to the conventional technology acquires the entropy-decoded data output from the entropy decoding unit. The dimensional decompression unit in the conventional technology decompresses the number of dimensions of the acquired entropy-decoded data using the intermediate data stored in the intermediate data memory and generates a decoded frame group.

On the other hand, in the decoding unit 210 according to the first embodiment, as described above, the correction unit 214 acquires the decompressed decoded data from the dimensional decompression unit 212, and acquires the intermediate data from the intermediate data memory 213. The correction unit 214 generates a decoded frame group by correcting the decompressed decoded data using the intermediate data.

Operation of Video Encoding Device

Hereinafter, an example of the operation of the video encoding device 10 will be described.

Figure 5:
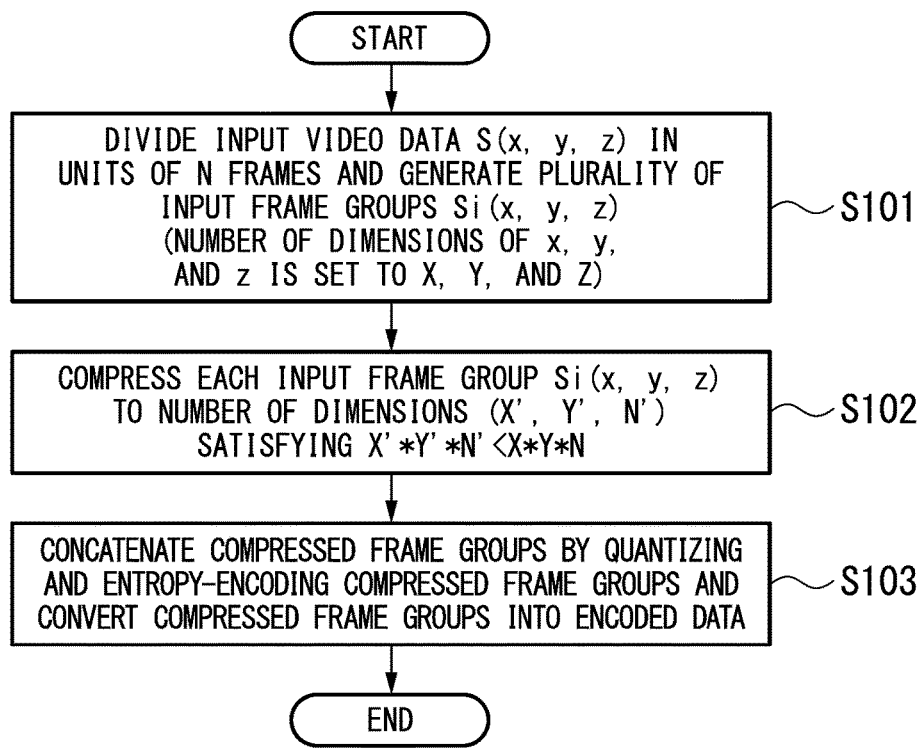
FIG. 5 is a flowchart showing an operation of a video encoding device 10 according to the first embodiment.

FIG. 5 is a flowchart showing the operation of the video encoding device 10 according to the first embodiment.

The video dividing unit 110 acquires input video data $S(x, y, z)$ in a horizontal direction x, a vertical direction y, and a time direction z. The video dividing unit 110 generates a plurality of input frame groups $Si(x, y, z)$ by dividing the acquired input video data $S(x, y, z)$ in units of N frames (step S101). Here, the number of dimensions of x, y, and z is set to X, Y, and Z, respectively. Also, i is an index representing a number of the input frame group.

Also, sizes of the frame groups do not necessarily have to be the same. For example, a frame group including N frames and a frame group including L frames (L is a positive number different from N) may be mixed. Also, for example, a configuration in which the input video data $S(x, y, z)$ is alternately divided into N frames and L frames and a frame group including an N-frame group and a frame group including an L-frame group are alternately generated may be adopted.

The dimensional compression unit 121 of the encoding unit 120 generates a compressed frame group by compressing each input frame group $Si(x, y, z)$ so that the number of dimensions (X', Y', N') is provided (step S102). The number of dimensions (X', Y', N') is the number of dimensions satisfying $X'*Y'*N'<X*Y*N$.

Figure 6:
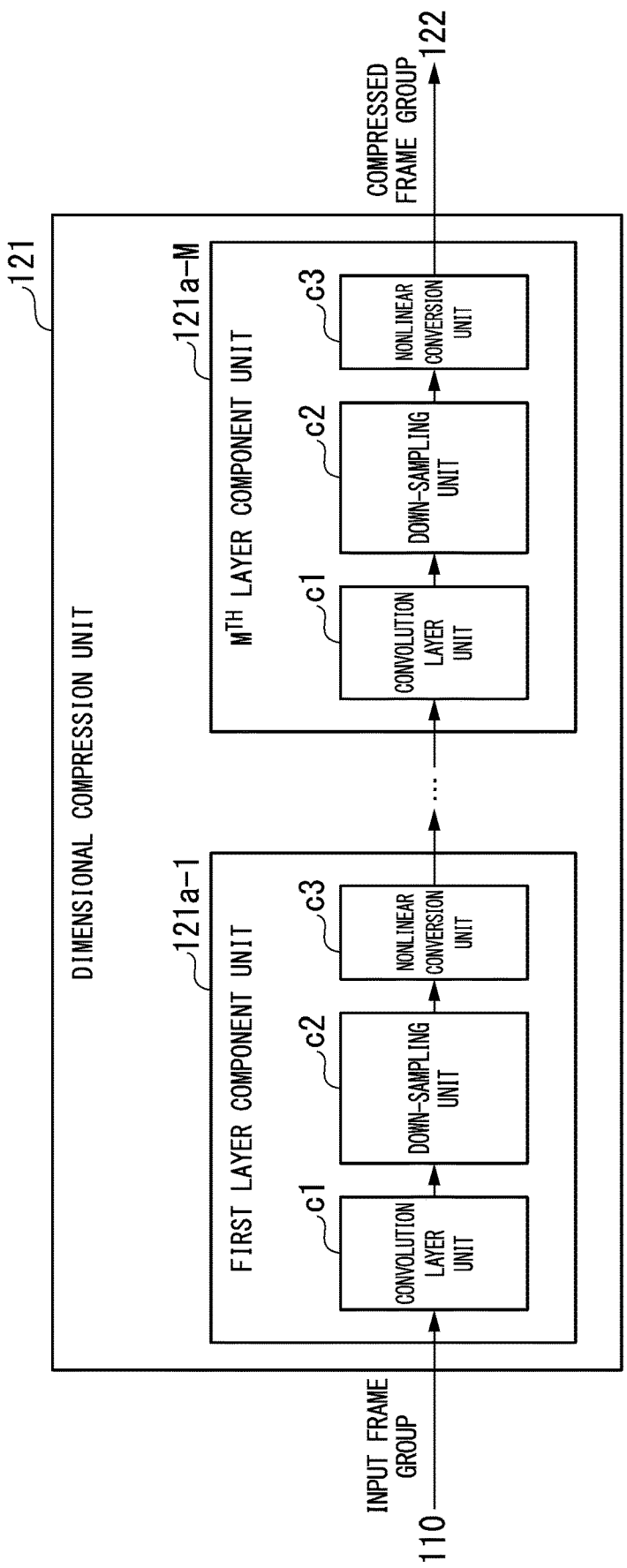
FIG. 6 is a configuration diagram of a dimensional compression unit 121 of the video encoding/decoding system 1 according to the first embodiment.

Also, for example, the dimensional compression unit 121 includes a neural network (a combination of a convolution operation, down-sampling, and nonlinear conversion) as shown in FIG. 6.

FIG. 6 is a configuration diagram of the dimensional compression unit 121 of the video encoding/decoding system 1 according to the first embodiment. As shown in FIG. 6, the dimensional compression unit 121 includes a component unit including M layers (first to $M^{th}$ layer component units 121a-1 to 121a-M). Each component unit includes a convolution layer unit c1, a down-sampling unit c2, and a nonlinear conversion unit c3.

The convolution layer portion c1 of the first layer component unit 121a-1 acquires an input frame group output from the video dividing unit 100. The convolution layer unit c1 of the first layer component unit 121a-1 performs a convolution operation on the acquired input frame group. The convolution layer unit c1 outputs the frame group on which the convolution operation has been performed to the down-sampling unit c2.

The down-sampling unit c2 of the first layer component unit 121a-1 acquires the frame group output from the convolution layer unit c1. The down-sampling unit c2 compresses the acquired frame group so that the number of dimensions is reduced. The down-sampling unit c2 outputs the compressed frame group to the nonlinear conversion unit c3.

The nonlinear conversion unit c3 of the first layer component unit 121a-1 acquires the frame group output from the down-sampling unit c2. The nonlinear conversion unit c3 performs a nonlinear conversion process on the acquired frame group. The nonlinear conversion unit c3 outputs the frame group on which the nonlinear conversion process has been performed to the convolution layer unit c1 of the next layer component unit (a second layer component unit).

By iterating the above-described process from the first layer to the $M^{th}$ layer, the dimensional compression unit 121 converts the input frame group input from the video dividing unit 100 into a compressed frame group with a reduced number of dimensions and outputs the compressed frame group to the quantization/entropy encoding unit 122.

The description will be given with reference again to FIG. 5.

The quantization/entropy encoding unit 122 of the encoding unit 120 performs quantization and entropy encoding on each compressed frame group. The quantization/entropy encoding unit 122 generates encoded data by concatenating quantized and entropy-encoded compressed frames (step S103).

Accordingly, the operation of the video encoding device 10 shown in the flowchart of FIG. 5 is completed.

Operation of Video Decoding Device

Hereinafter, an example of an operation of the video decoding device 20 will be described.

Figure 7:
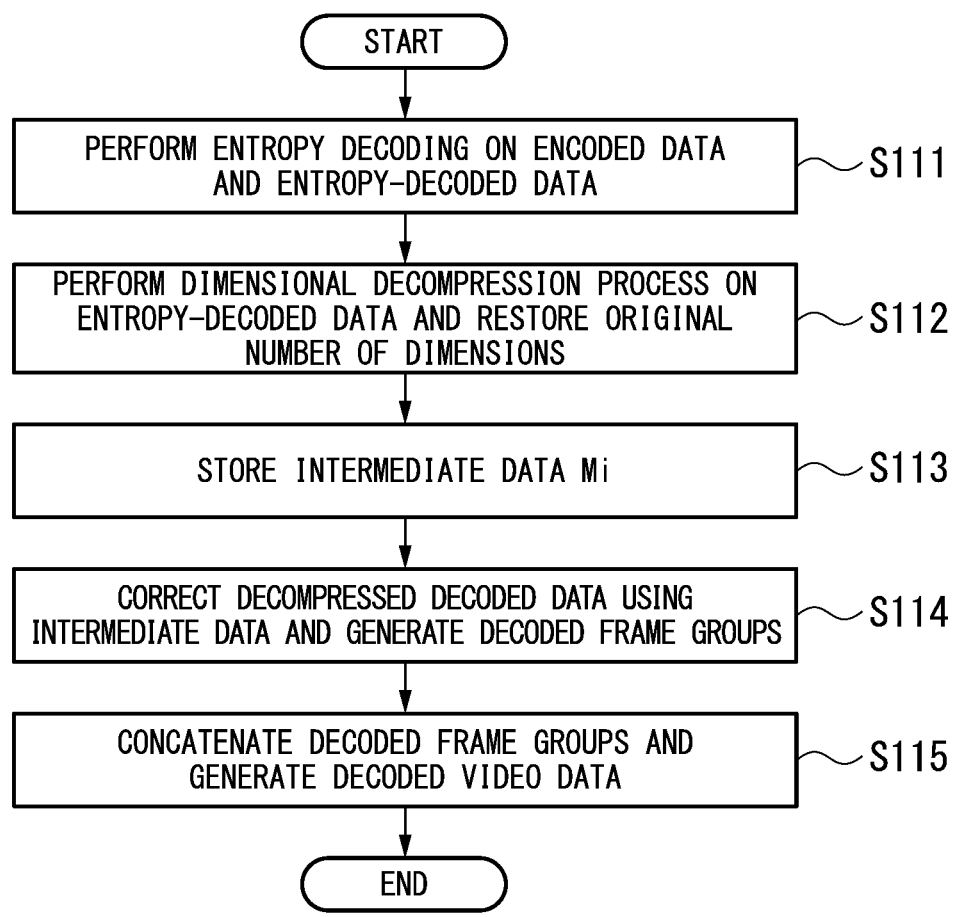
FIG. 7 is a flowchart showing an operation of a video decoding device 20 according to the first embodiment.

FIG. 7 is a flowchart showing the operation of the video decoding device 20 according to the first embodiment.

The entropy decoding unit 211 of the decoding unit 210 acquires encoded data. The entropy decoding unit 211 generates entropy-decoded data by performing entropy decoding on the acquired encoded data (step S111).

The dimensional decompression unit 212 of the decoding unit 210 generates decompressed decoded data by restoring the original number of dimensions (before the number of dimensions is reduced by the dimensional compression unit 121) from the generated entropy-decoded data (step S112).

Figure 8:
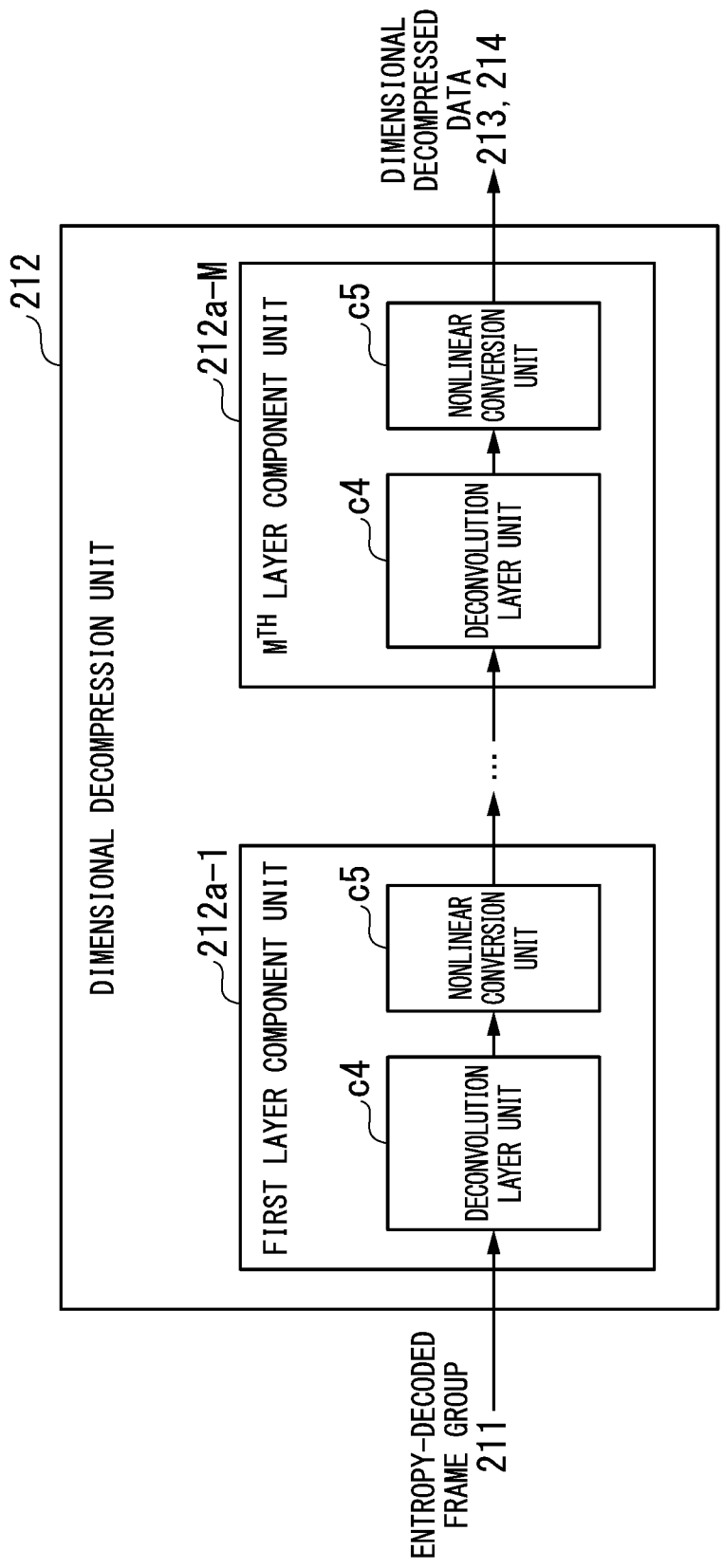
FIG. 8 is a configuration diagram of a dimensional decompression unit 212 of the video encoding/decoding system 1 according to the first embodiment.

Also, for example, the dimensional decompression unit 212 includes a neural network (a combination of a deconvolution operation and nonlinear conversion) as shown in FIG. 8.

FIG. 8 is a configuration diagram of the dimensional decompression unit 212 of the video encoding/decoding system 1 according to the first embodiment. As shown in FIG. 8, the dimensional decompression unit 212 includes a component unit including M layers (first to $M^{th}$ layer component units 212a-1 to 212a-M). Each component unit includes a deconvolution layer unit c4 and a nonlinear conversion unit c5.

The deconvolution layer unit c4 of the first layer component unit 212a-1 acquires an entropy-decoded frame group output from the entropy decoding unit 211. The deconvolution layer unit c4 performs a deconvolution operation on the acquired entropy-decoded frame group. The deconvolution layer unit c4 outputs the frame group on which the deconvolution operation has been performed to the nonlinear conversion unit c5.

The nonlinear conversion unit c5 of the first layer component unit 212a-1 acquires the frame group output from the deconvolution layer unit c4. The nonlinear conversion unit c5 performs a nonlinear conversion process on the acquired frame group. The nonlinear conversion unit c5 outputs the frame group on which the nonlinear conversion process has been performed to the deconvolution layer unit c4 of the next layer component unit (the second layer component unit).

By iterating the above-described process from the first layer to the $M^{th}$ layer, the dimensional decompression unit 212 converts an entropy-decoded frame group output from the entropy decoding unit 211 into dimensional decompressed data in which the number of dimensions has been restored and outputs the dimensional decompressed data to the intermediate data memory 213 and the correction unit 214.

The description will be given with reference again to FIG. 7.

The intermediate data memory 213 of the decoding unit 210 stores the intermediate data Mi, which is the decompressed decoded data generated in step S112 (step S113).

The correction unit 214 of the decoding unit 210 corrects the decompressed decoded data acquired from the dimensional decompression unit 212 using the intermediate data Mi stored in the intermediate data memory 213.

Here, the correction unit 214 corrects the decompressed decoded data which is a correction target using the intermediate data Mi−1 which is the intermediate data stored in the intermediate data memory 213 prior to the intermediate data corresponding to the decompressed decoded data. For example, the correction unit 214 corrects the decompressed decoded data corresponding to the intermediate data Mi using the intermediate data Mi−1, which is the intermediate data immediately before the intermediate data Mi in the time direction. Also, the number of intermediate data elements for use in correction may be two or more.

The correction unit 214 performs correction by concatenating the decompressed decoded data corresponding to the intermediate data Mi with the intermediate data Mi−1 in the z-direction dimension. The correction unit 214 generates a decoded frame group by performing the above-described process on all decompressed decoded data (step S114).

Also, the reason why the correction process is performed by the correction unit 214 is as follows. Because encoding is performed on each frame group including frames in the time direction z, subjective continuity may not be ensured between frame groups that are close to each other or adjacent to each other in time. Therefore, the correction process is performed on the decompressed decoded data using intermediate data that is close to or adjacent to the decompressed decoded data in time so that continuity is ensured. By providing the continuity, the subjective image quality of the decoded video obtained by concatenating the frame groups is improved.

The video concatenating unit 220 generates decoded video data by concatenating the generated decoded frame groups (step S115).

Accordingly, the operation of the video decoding device 20 shown in the flowchart of FIG. 7 is completed.

Figure 9:
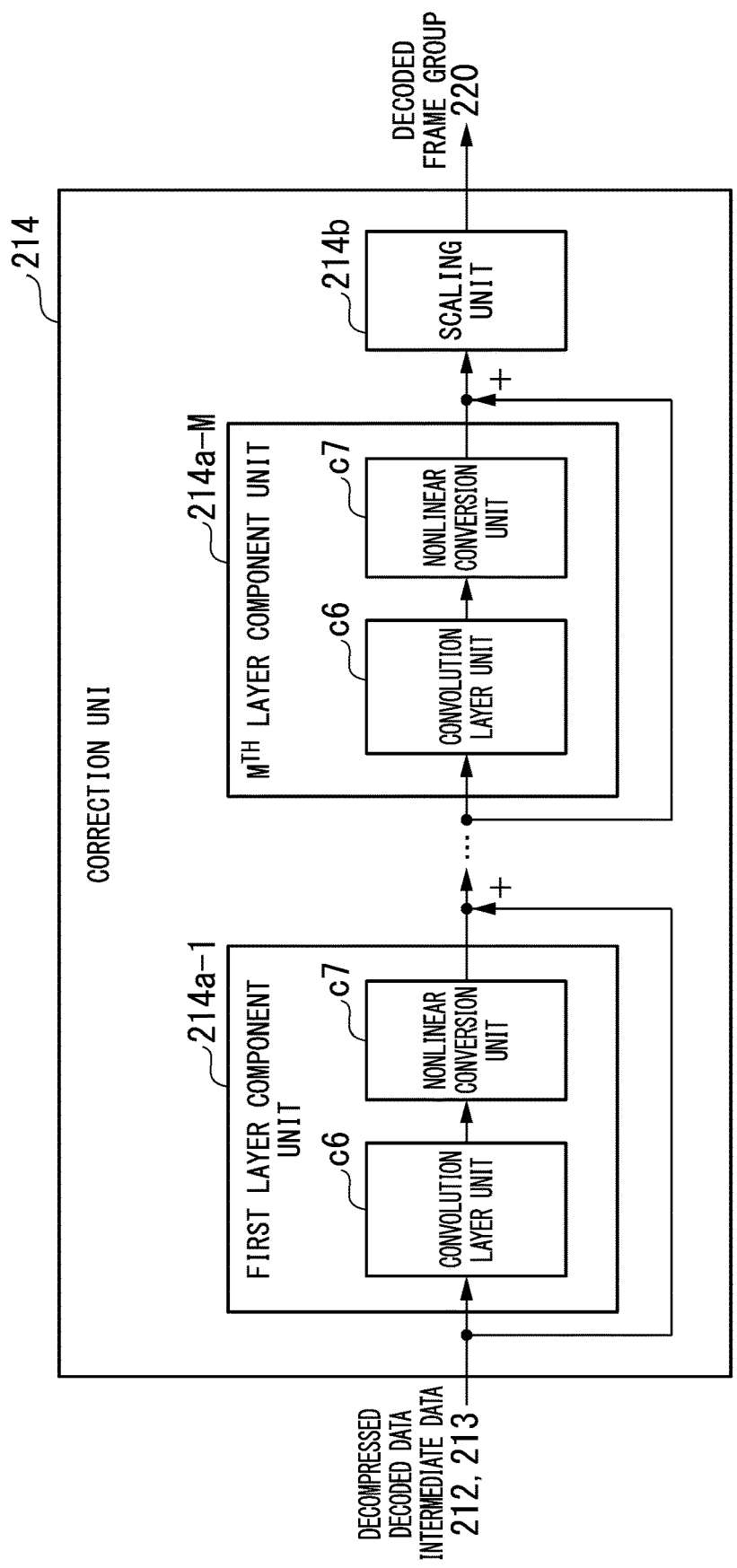
FIG. 9 is a configuration diagram of a correction unit 214 of the video encoding/decoding system 1 according to the first embodiment.

Also, for example, the correction unit 214 includes a neural network (a combination of a convolutional operation and nonlinear conversion and a scaling process) as shown in FIG. 9.

FIG. 9 is a configuration diagram of the correction unit 214 of the video encoding/decoding system 1 according to the first embodiment. As shown in FIG. 9, the correction unit 214 includes a component unit including M layers (first to $M^{th}$ layer component units 214a-1 to 214a-M) and a scaling unit 214b. Each component unit includes a convolution layer unit c6 and a nonlinear conversion unit c7.

The convolution layer unit c6 of the first layer component unit 214a-1 acquires the decompressed decoded data output from the dimensional decompression unit 212 and the intermediate data stored in the intermediate data memory 213. The convolution layer unit c6 performs a convolution operation on the acquired decompressed decoded data. The convolution layer unit c6 outputs the frame group on which the convolution operation has been performed to the nonlinear conversion unit c7.

The nonlinear conversion unit c7 of the first layer component unit 214a-1 acquires the frame group output from the convolution layer unit c6. The nonlinear conversion unit c5 performs a nonlinear conversion process on the acquired frame group. The nonlinear conversion unit c7 outputs a frame group on which the nonlinear conversion process has been performed. Data obtained by adding the frame group output from the nonlinear conversion unit c7 to immediately previous intermediate data is input to the convolution layer unit c6 of the component unit (the second layer component unit) of the next layer.

In the correction unit 214, the scaling unit 214b scales a frame group obtained by iterating the above-described process from the first layer to the $M^{th}$ layer. By the above-described process, the correction unit 214 corrects the decompressed decoded data output from the dimensional decompression unit 212 with the intermediate data stored in the intermediate data memory 213 and outputs a decoded frame group, which is the corrected decompressed decoded data, to the video concatenating unit 220.

Learning Processes

Hereinafter, learning processes of neural networks of the dimensional compression unit 121, the dimensional decompression unit 212, and the correction unit 214 will be described.

The learning processes of the neural networks of the dimensional compression unit 121, the dimensional decompression unit 212, and the correction unit 214 are performed at the same time.

Figure 10:
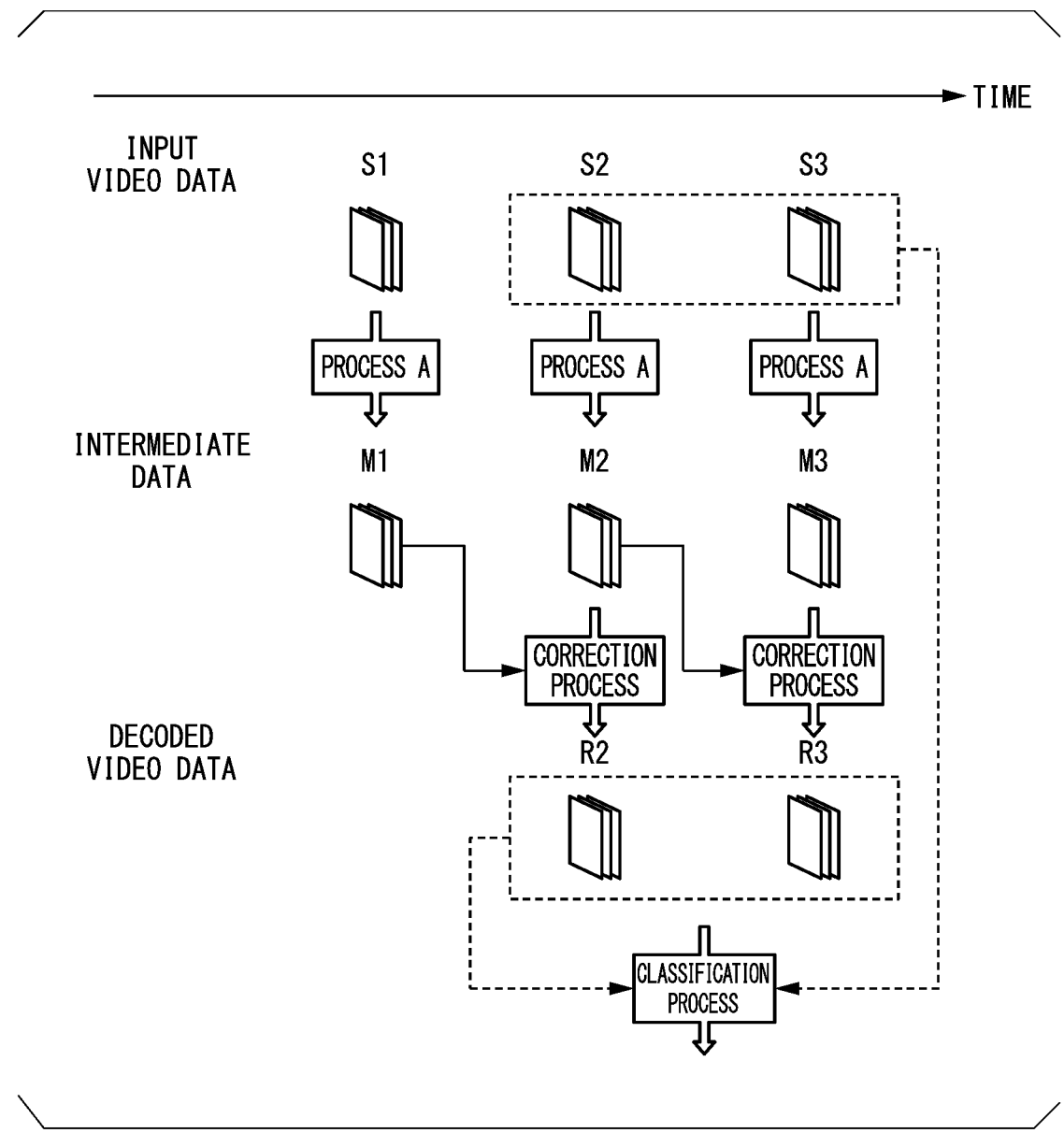
FIG. 10 is a schematic diagram for describing a learning process of the video encoding/decoding system 1 according to the first embodiment.

FIG. 10 is a schematic diagram for describing the learning process of the video encoding/decoding system 1 according to the first embodiment.

As shown in FIG. 10, a data set in which three input frame groups which are continuous in time are used as one sample data element is first input as input data. Hereinafter, it is assumed that these three input frame groups are S1(x, y, z), S2(x, y, z) (first frame group), and S3(x, y, z) (second frame group) in chronological order, respectively.

Next, a process A is executed on the input frame groups S1(x, y, z), S2(x, y, z), and S3(x, y, z). The process A used here includes a dimensional compression process, a quantization/entropy encoding process, an entropy decoding process, and a dimensional decompression process. Thereby, intermediate data is generated. Hereinafter, it is assumed that intermediate data generated on the basis of the input frame groups S1(x, y, z), S2(x, y, z), and S3(x, y, z) is M1(x, y, z), M2(x, y, z) (a feature quantity of the first frame group), and M3(x, y, z) (a feature quantity of the second frame group).

Next, as shown in FIG. 10, correction is performed with M1(x, y, z) and M2(x, y, z) designated as a set and M2(x, y, z) and M3(x, y, z) designated as a set. Specifically, correction is performed with the decompressed decoded data corresponding to the intermediate data M1(x, y, z) and the intermediate data M2(x, y, z) designated as a set and the decompressed decoded data corresponding to the intermediate data M2(x, y, z) and the intermediate data M3(x, y, z) designated as a set. Thereby, two decoded frame groups are generated. Hereinafter, the decoded frame groups are referred to as R2(x, y, z) and R3(x, y, z) (corrected frame groups).

Next, a loss value loss is calculated using the loss function defined by the following Eqs. (1) to (3).

$$\text{Loss} = \text{Restoration error 1} + \text{Restoration error 2} + \text{GAN}(\text{concat}(R2, R3)) + \text{FM}(\text{concat}(S2, S3), \text{concat}(R2, R3)) \quad (1)$$

$$\text{Restoration error 1} = \Sigma x \Sigma y \Sigma z(\text{diff}(S2(x, y, z), R2(x, y, z))) + \Sigma x \Sigma y \Sigma z(\text{diff}(S3(x, y, z), R3(x, y, z))) \quad (2)$$

$$\begin{aligned}\text{Restoration error 2} =& \Sigma x \Sigma y \Sigma z(w(z)*\text{diff}(M2(x, y, z),\\ & R2(x, y, z))) + \Sigma x \Sigma y \Sigma z(w(z)*\text{diff}(M3(x, y, z),\\ & R3(x, y, z)))\end{aligned} \quad (3)$$

Here, diff(a, b) is a function (for example, a square error or the like) for measuring a distance between a and b. Also, w(z) is a weighting coefficient according to the time direction z. Also, w(z) is set so that a weight increases as an index z increases. That is, the weight in the correction is set to be heavy in proportion to intermediate data corresponding to an input frame group subsequent to an input frame group of an encoding target in time. For example, w(z)=z, w(z)=z2, or the like is used. concat( ) represents an operation of concatenating inputs in the time direction. GAN(x) is a classifier that determines whether or not an input video x is a true video and outputs a probability thereof. The classifier is constructed by a neural network. FM(a, b) is a sum of errors (for example, square errors or the like) with respect to values of intermediate layers of the neural network when a and b have been input to the classifier.

Next, a parameter value of each part is updated according to an error back-propagation algorithm or the like using a calculated loss value. Learning is performed by iterating the above-described series of flows serving as one iteration a certain number of times using a plurality of sample data elements. Alternatively, learning is performed by performing iterations until the loss value converges. Also, configurations of the loss functions shown in the above-described Eqs. (1) to (3) are examples and the above-described equation may be a loss function in which only a partial error in the above is calculated, a loss function to which a different error term is added, or the like.

As described above, the flow of the learning process in the first embodiment is as follows.

1. Three continuous input frame groups are provided as one sample.

2. Each sample is input to a neural network (an encoder/decoder) serving as an autoencoder to obtain intermediate data.

3. Decoded video data corresponding to S2(x, y, z) and S3(x, y, z) is obtained by the neural network for correction.

4. The loss is calculated by summing the following values 1) to 4)

1) A restoration error between S2(x, y, z) and R2(x, y, z) and a restoration error between S3(x, y, z) and R3(x, y, z).

2) A weighted restoration error between M2(x, y, z) and R2(x, y, z) and a weighted restoration error between M3(x, y, z) and R3(x, y, z) error.

3) A GAN error (a binary cross entropy error when R2(x, y, z) and R3(x, y, z) are input to the neural network that performs a classification process).

4) An FM error (an error of an intermediate layer feature quantity when S2(x, y, z), S3(x, y, z), R2(x, y, z), and R3(x, y, z) are input to the neural network that performs the classification process).

5. Each neural network is updated according to an error back-propagation algorithm.

Also, the classification process used here is a process of classifying whether or not the video based on the input video data is a true video.

Also, the weighted restoration error of 2) is a term to be calculated to be continuous with an adjacent frame group which is subsequent in time. The GAN error of 3) and the FM error of 4) are terms to be calculated so that the video based on the decoded video data becomes a more natural output.

Also, as described above, here, a configuration in which learning is performed so that M1(x, y, z), M2(x, y, z), M3(x, y, z), R2(x, y, z), and R3(x, y, z) are generated from S1(x, y, z), S2(x, y, z), and S3(x, y, z), which are three input frame groups which are continuous in time, and R2(x, y, z)+R3(x, y, z) becomes natural (i.e., R2(x, y, z)+R3(x, y, z) has continuity) is provided.

However, the present invention is not limited to the configuration in which a data set including three input frame groups which are continuous in time is input as described above and a configuration in which a data set including four or more input frame groups which are continuous in time is input may be adopted.

For example, a configuration in which M1(x, y, z), M2(x, y, z), M3(x, y, z), M4(x, y, z), R2(x, y, z), R3(x, y, z), and R4(x, y, z) are generated from four input frame groups S1(x, y, z), S2(x, y, z), S3(x, y, z), and S4(x, y, z) which are continuous in time and R2(x, y, z)+R3(x, y, z)+R4(x, y, z) becomes natural (i.e., R2(x, y, z)+R3(x, y, z)+R4(x, y, z) has continuity) may be provided.

As described above, the video encoding/decoding system 1 according to the first embodiment stores encoded data as intermediate data in the intermediate data memory 213 without decoding the encoded data into the decoded video data as it is. The video encoding/decoding system 1 performs a correction process on the encoded data of a processing target using nearby data (intermediate data), which is continuous in time, and decodes the encoded data. Thereby, the continuity between the nearby data, which is continuous in time, and the encoded data of the processing target is maintained.

Moreover, in the video encoding/decoding system 1 according to the first embodiment, data required for decoding encoded data of the processing target is only a small number of nearby data elements (only immediately previous intermediate data in the first embodiment). Thereby, the video encoding/decoding system 1 can perform encoding and decoding having random accessibility and parallelism on the image data.

Also, the video encoding/decoding system 1 according to the first embodiment performs learning using restoration error 2 as described above. Thus, for example, when M2(x, y, z) shown in FIG. 10 is corrected to R2(x, y, z), continuity between R2(x, y, z) and R3(x, y, z) are maintained. A constraint condition in which no change occurs in a frame close to R3(x, y, z) is used to maintain continuity between R2(x, y, z) and R3(x, y, z). That is, a constraint condition for increasing subjective image quality based on a relationship between S2(x, y, z) and S3(x, y, z), which is an input frame group subsequent to S2(x, y, z) in time, is used. Thereby, according to the video encoding/decoding system 1, correction is performed so that R2(x, y, z) is continuous with R3(x, y, z), so that the image quality is improved.

Also, in the video encoding/decoding system 1 according to the first embodiment, a neural network (the dimensional compression unit 121 and the dimensional decompression unit 212) serving as an autoencoder (a first learning model) and a neural network (the correction unit 214) for ensuring the continuity (a second learning model) are separate neural networks and separate learning processes are performed, so that the learning processes are stable.

Second Embodiment

Hereinafter, a second embodiment of the present invention will be described with reference to the drawings.

Hereinafter, a video encoding/decoding system according to the second embodiment will be described. Because an overall configuration of the video encoding/decoding system and a configuration of an encoding unit according to the second embodiment are the same as the overall configuration of the video encoding/decoding system 1 and the configuration of the encoding unit 120 according to the first embodiment described with reference to FIGS. 1 and 2, the description thereof will be omitted. The video encoding/decoding system 1 according to the first embodiment and the video encoding/decoding system according to the second embodiment to be described below are different in a configuration of a decoding unit included in a video decoding device.

Figure 11:
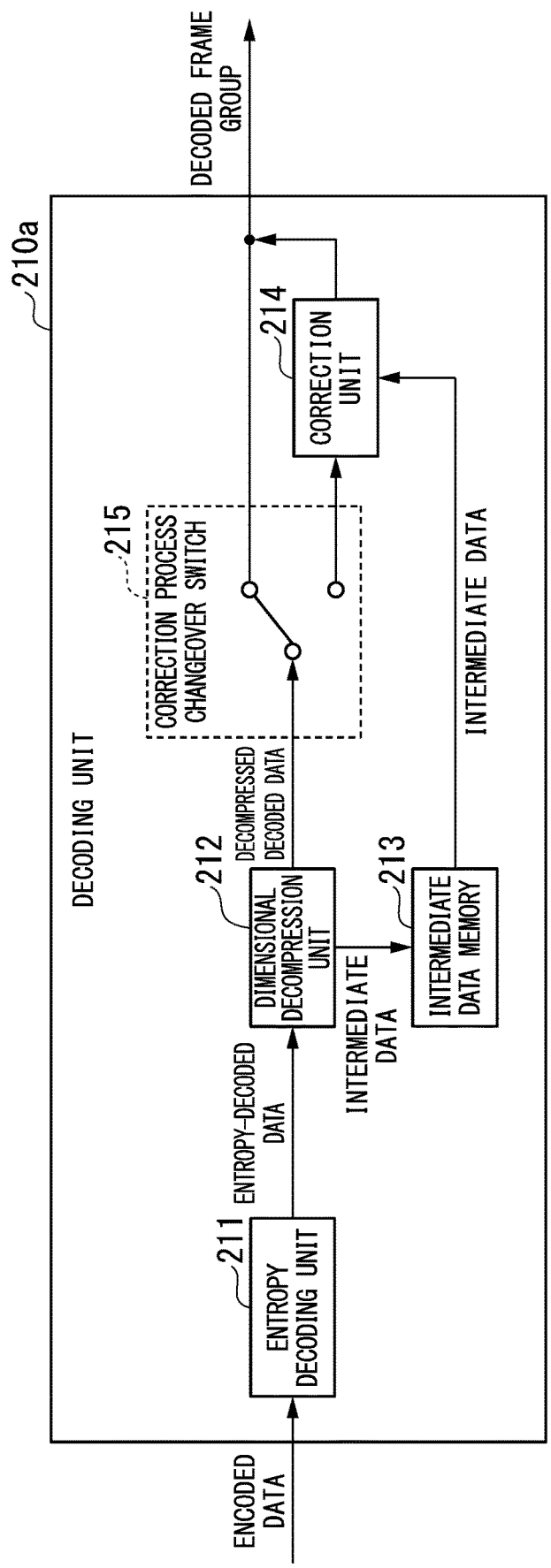
FIG. 11 is a configuration diagram of a decoding unit 210a of a video encoding/decoding system according to a second embodiment.

Hereinafter, a configuration of a decoding unit 210a included in the video decoding device of the video encoding/decoding system according to the second embodiment is shown in FIG. 11. Functional blocks having the same functional configuration as those of the first embodiment are denoted by the same reference signs and the description thereof will be omitted. As shown in FIG. 11, the decoding unit 210a is configured to include an entropy decoding unit 211, a dimensional decompression unit 212, an intermediate data memory 213, a correction unit 214, and a correction process changeover switch 215.

A difference between the decoding unit 210a according to the second embodiment and the decoding unit 210 according to the first embodiment is that the decoding unit 210a further includes the correction process changeover switch 215 in addition to the functional configuration of the decoding unit 210.

The dimensional decompression unit 212 outputs generated decompressed decoded data to each of the intermediate data memory 213 and the correction process changeover switch 215.

The correction process changeover switch 215 acquires the decompressed decoded data output from the dimensional decompression unit 212. The correction process changeover switch 215 switches between whether the acquired decompressed decoded data is to be output as a decoded frame group to the video concatenating unit as it is or is output to the correction unit 214.

The correction unit 214 acquires the decompressed decoded data output from the correction process changeover switch 215. Also, the correction unit 214 acquires the intermediate data stored in the intermediate data memory 213. The correction unit 214 generates a decoded frame group by correcting the decompressed decoded data using the intermediate data. The correction unit 214 outputs the generated decoded frame group to the video concatenating unit 220.

An operation of the video encoding device according to the second embodiment is the same as the operation of the video encoding device 10 according to the first embodiment described with reference to FIG. 5. Consequently, the description of the operation of the video encoding device according to the second embodiment will be omitted.

Operation of Video Decoding Device

Hereinafter, an example of the operation of the video decoding device according to the second embodiment will be described.

Figure 12:
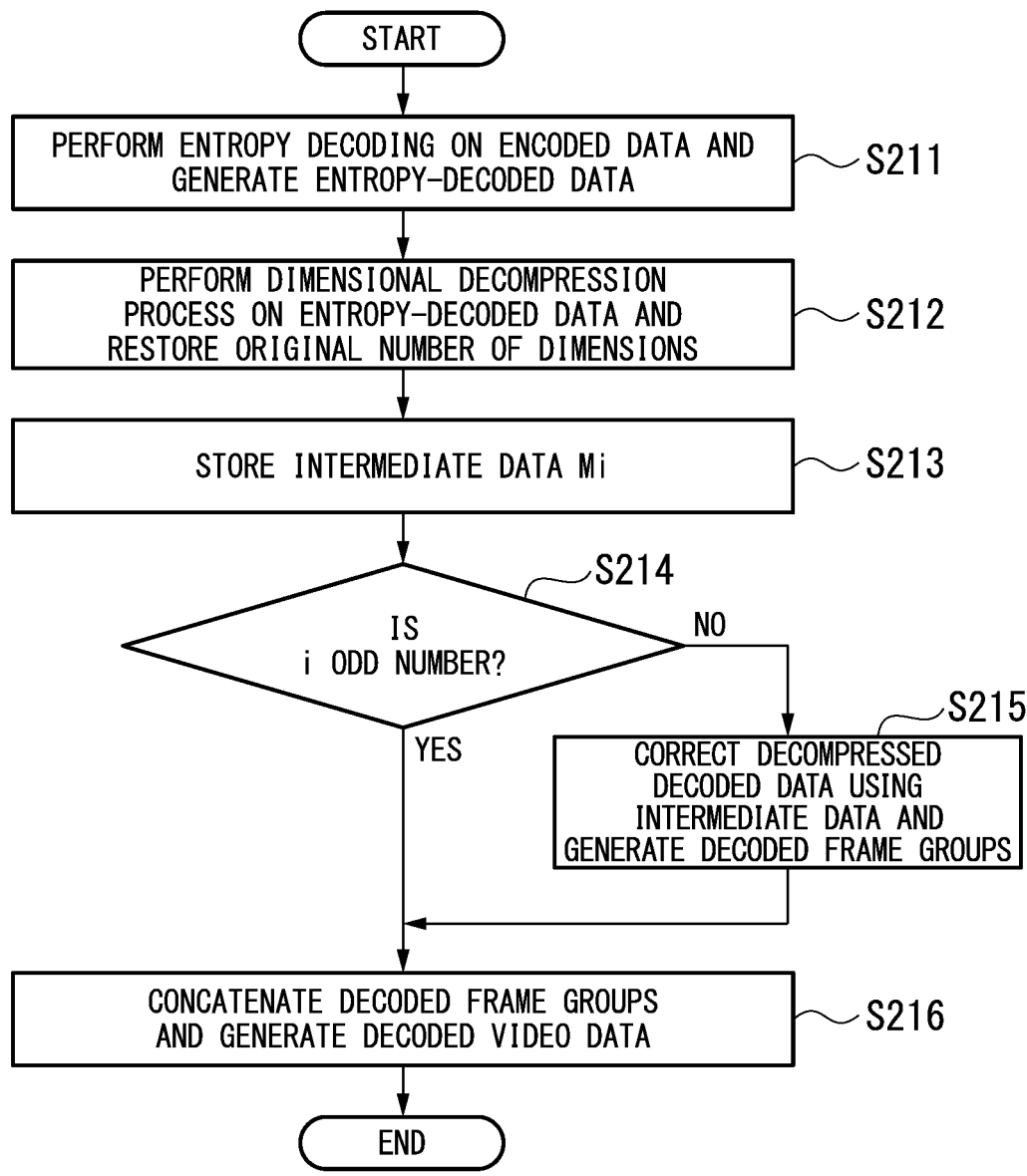
FIG. 12 is a flowchart showing an operation of a video decoding device according to the second embodiment.

FIG. 12 is a flowchart showing the operation of the video decoding device 20 according to the second embodiment.

The entropy decoding unit 211 of the decoding unit 210a acquires encoded data. The entropy decoding unit 211 generates entropy-decoded data by performing entropy decoding on the acquired encoded data (step S211).

The dimensional decompression unit 212 of the decoding unit 210a generates decompressed decoded data by restoring the original number of dimensions (before the number of dimensions is reduced by the dimensional compression unit) from the generated entropy-decoded data (step S212).

The intermediate data memory 213 of the decoding unit 210a stores intermediate data Mi, which is the decompressed decoded data generated in step S212 (step S213).

The correction process changeover switch 215 of the decoding unit 210a confirms a value of an index i representing a number of an input frame group with reference to the decompressed decoded data generated by the dimensional decompression unit 212. When the value of i is an odd number (step S214: YES), the correction process changeover switch 215 outputs the acquired decompressed decoded data as a decoded frame group to the video concatenating unit as it is.

The video concatenating unit generates decoded video data by concatenating generated decoding frame groups (step S216).

Accordingly, the operation of the video decoding device 20 shown in the flowchart of FIG. 12 is completed.

On the other hand, when the value of i is an even number (step S214: NO), the correction process changeover switch 215 outputs the acquired decompressed decoded data to the correction unit 214 of the decoding unit 210a. The correction unit 214 corrects the decompressed decoded data acquired via the correction process changeover switch 215 using the intermediate data Mi stored in the intermediate data memory 213.

Also, the correction process changeover switch 215 may be configured to output the decompressed decoded data as a decoded frame group to the video concatenating unit as it is when the value of i is an even number and output the decompressed decoded data to the correction unit 214 when the value of i is an odd number.

As described above, the correction process changeover switch 215 alternately performs a correction process on the acquired decompressed decoded data and the purpose thereof is as follows.

In the first embodiment, a configuration in which subjective image quality is improved by correcting a frame group (Mi) so that the frame group (Mi) is continuous with a previous frame group (Mi−1) in time is adopted. However, the previous frame group (Mi−1) is corrected on the basis of a previous frame group (Mi−2) previous to the previous frame group (Mi−1) in time. Thus, because the previous frame group (Mi−1) is a frame group that is different from that at a point in time when the frame group (Mi) of a correction target has been referred to, it is not ensured that the final output has temporal continuity.

On the other hand, in the second embodiment, a configuration in which a corrected frame group and an uncorrected frame group are alternately continuous is adopted. Thereby, in the second embodiment, after a frame group of a correction target is corrected, frame groups before and after the frame group of the correction target do not change from the time of reference, so that temporal continuity is ensured.

Here, the correction unit 214 performs correction using intermediate data Mi−1 (a first frame group) and intermediate data Mi+1 (a third frame group) with respect to the decompressed decoded data (a second frame group) of a correction target. Here, the intermediate data Mi−1 is intermediate data stored in the intermediate data memory 213 before the intermediate data Mi corresponding to the decompressed decoded data. Also, the intermediate data Mi+1 is intermediate data stored in the intermediate data memory 213 after the intermediate data Mi corresponding to the decompressed decoded data. For example, the correction unit 214 corrects the decompressed decoded data corresponding to the intermediate data Mi using the intermediate data Mi−1, which is intermediate data immediately before the intermediate data Mi in the time direction, and the intermediate data Mi+1, which is intermediate data immediately after the intermediate data Mi in the time direction. The number of intermediate data elements used for correction may be three or more.

The correction unit 214 corrects the decompressed decoded data corresponding to the intermediate data Mi by concatenating the intermediate data Mi−1 and the intermediate data Mi+1 in the z-direction dimension. The correction unit 214 generates decoded frame groups by performing the above-described process on all decompressed decoded data (step S215).

The video concatenating unit generates decoded video data by concatenating the generated decoded frame groups (step S216).

Accordingly, the operation of the video decoding device 20 shown in the flowchart of FIG. 12 is completed.

Learning Processes

Hereinafter, learning processes of neural networks of the dimensional compression unit, the dimensional decompression unit, and the correction unit 214 according to the second embodiment will be described.

The learning processes of neural networks of the dimensional compression unit, the dimensional decompression unit, and the correction unit 214 are performed at the same time.

Figure 13:
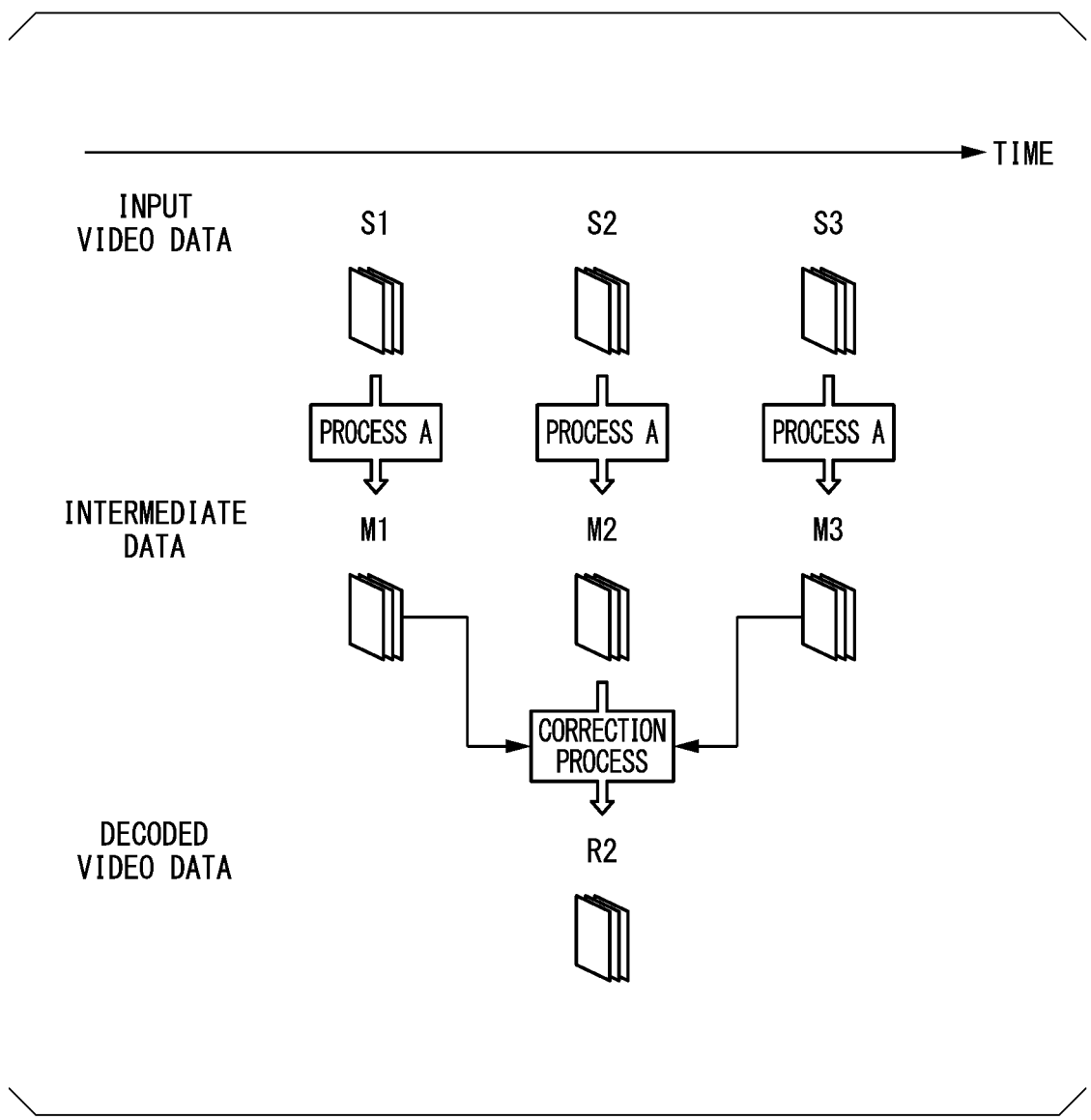
FIG. 13 is a schematic diagram for explaining a learning process of a video encoding/decoding system according to the second embodiment.
Figure 14:
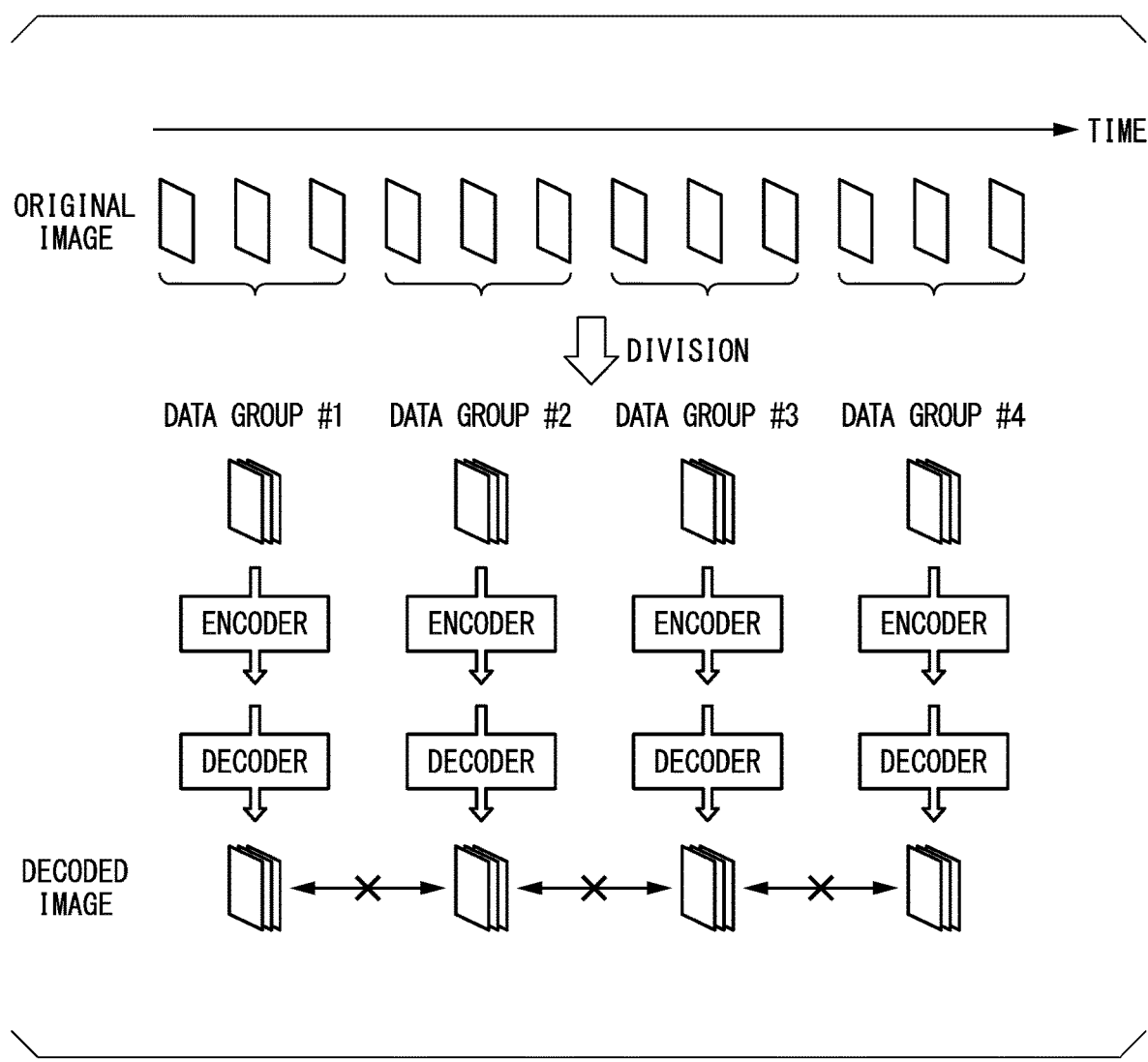
FIG. 14 is a schematic diagram for explaining a learning process of a video encoding/decoding system according to conventional technology.
Figure 15:
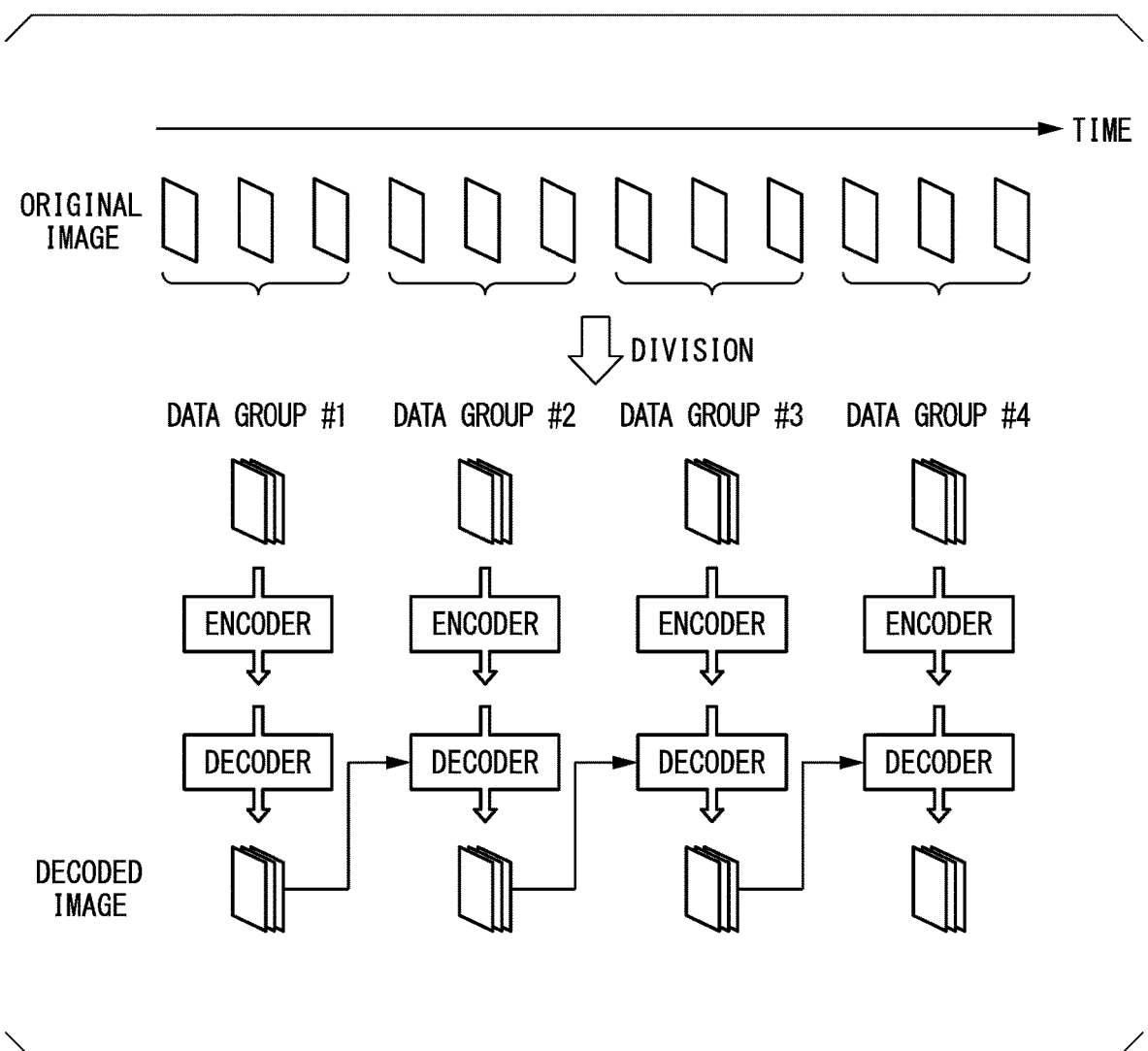
FIG. 15 is a schematic diagram for describing a learning process of a video encoding/decoding system according to conventional technology.

FIG. 13 is a schematic diagram for describing the learning process of the video encoding/decoding system according to the second embodiment.

As shown in FIG. 13, a data set in which three input frame groups which are continuous in time are used as one sample data element is first input as input data. Hereinafter, it is assumed that these three input frame groups are S1(x, y, z), S2(x, y, z), and S3(x, y, z) in chronological order, respectively.

Next, a process A is executed on the input frame groups S1(x, y, z), S2(x, y, z), and S3(x, y, z). The process A used here includes the dimensional compression process, the quantization/entropy encoding process, the entropy decoding process, and the dimensional decompression process as described above. Thereby, intermediate data is generated. Hereinafter, it is assumed that intermediate data generated on the basis of the input frame group S1(x, y, z), S2(x, y, z), and S3(x, y, z) is M1(x, y, z), M2(x, y, z), and M3(x, y, z).

Next, as shown in FIG. 13, correction is performed with M1(x, y, z), M2(x, y, z), and M3(x, y, z) designated as a set. Specifically, correction is performed with the decompressed decoded data corresponding to the intermediate data M2(x, y, z), the intermediate data M1(x, y, z), and the intermediate data M3(x, y, z) designated as a set. Thereby, a decoded frame group is generated. Hereinafter, it is assumed that the generated decoded frame group is R2(x, y, z).

Next, a loss value loss is calculated using a loss function defined by the following Eqs. (4) and (5).

$$\text{Loss} = \text{Restoration error 1} + \text{GAN}(\text{concat}(M1, R2, M3)) + \text{FM}(\text{concat}(S1, S2, S3), \text{concat}(M1, R2, M3)) \quad (4)$$

$$\text{Restoration error 1} = \Sigma x \Sigma y \Sigma z (\text{diff}(S1(x, y, z), M1(x, y, z))) + \Sigma x \Sigma y \Sigma z (\text{diff}(S3(x, y, z), M3(x, y, z))) \quad (5)$$

Here, diff(a, b) is a function (for example, a square error or the like) for measuring a distance between a and b. concat( ) is an operation of concatenating inputs in the time direction. GAN(x) is a classifier that determines whether or not an input video x is a true video and outputs a probability thereof. The classifier is constructed by a neural network. FM(a, b) is a sum of errors (for example, square errors or the like) with respect to values of intermediate layers of the neural network when a and b have been input to the classifier.

Next, a parameter value of each part is updated according to an error back-propagation algorithm or the like using a calculated loss value. Learning is performed by iterating the above-described series of flows serving as one iteration a certain number of times using a plurality of sample data elements. Alternatively, learning is performed by performing iterations until the loss value converges. Also, configurations of the loss functions shown in the above-described Eqs. (4) and (5) are examples and the above-described equation may be a loss function in which only a partial error in the above is calculated, a loss function to which a different error term is added, or the like.

By providing the above-described configuration, the video encoding/decoding system according to the second embodiment can perform encoding and decoding having random accessibility and parallelism on image data.

Also, as described above, the video encoding/decoding system 1 according to the first embodiment independently corrects each input frame group. Thus, in the video encoding/decoding system 1 according to the first embodiment, although each input is corrected so that the input is continuous with a previous output in time, how the previous output is corrected is unknown. Thus, in the video encoding/decoding system 1 according to the first embodiment, there is a possibility that it cannot be certainly ensured that the corrected decoded frame groups have continuity.

On the other hand, as described above, the video encoding/decoding system according to the second embodiment performs learning so that decompressed decoded data itself is used as a decoded frame group with respect to a frame group having an odd (or even) index value and performs correction so that the frame group is continuous with a frame group having an index value which is not an odd (or even) number. Thereby, because outputs before and after the frame group of a correction process target do not change, the video encoding/decoding system according to the second embodiment can ensure that a corrected decoded frame group and adjacent decoded frame groups before and after the corrected decoded frame group have continuity.

Also, a part or all of the video encoding/decoding system according to the above-described embodiment may be configured to be implemented by a computer. In this case, functions of the video encoding/decoding system may be implemented by recording a program for implementing the functions on a computer-readable recording medium and causing a computer system to read and execute the program recorded on the recording medium. Also, it is assumed that the "computer system" described here includes an operating system (OS) and hardware such as peripheral devices. Also, the "computer-readable recording medium" refers to a storage device including a flexible disk, a magneto-optical disc, a ROM, a portable medium such as a CD-ROM, and a hard disk embedded in the computer system. Further, the "computer-readable recording medium" is assumed to include a computer-readable recording medium for dynamically retaining a program for a short time as in a communication line when the program is transmitted via a network such as the Internet or a communication circuit such as a telephone circuit and a computer-readable recording medium for retaining the program for a predetermined time period as in a volatile memory inside the computer system including a server and a client when the program is transmitted. Also, the above-described program may be used to implement some of the above-described functions. Further, the program may implement the above-described functions in combination with a program already recorded on the computer system or may be implemented using hardware such as a programmable logic device (PLD) or a field programmable gate array (FPGA).

While embodiments of the present invention have been described with reference to the drawings, the above-described embodiments have been presented by way of example only and the present invention is not limited to the above-described embodiments. Accordingly, components may be added, omitted, replaced, and changed without departing from the spirit and scope of the inventions.

REFERENCE SIGNS LIST

1 Video encoding/decoding system
10 Video encoding device
20 Video decoding device
110 Video dividing unit
120 Encoding unit
121 Dimensional compression unit
122 Entropy encoding unit
210 Decoding unit
211 Entropy decoding unit
212 Dimensional decompression unit
213 Intermediate data memory
214 Correction unit
220 Video concatenating unit

The invention claimed is:

1. An image processing apparatus for performing correction for each frame group including a predetermined number of frames into which video data is divided, the image processing apparatus comprising:
   a processor; and
   a storage medium having computer program instructions stored thereon, wherein the computer program instructions, when executed by the processor, perform:
   for encoded data obtained by compressing the dimensions of the frame group and encoding them, and for decompressed decoded data obtained by decoding the encoded data and decompressing them to the dimensions before encoding, using a learned neural network, a correction step to obtain a corrected frame group by performing a correction in which the decompressed decoded data of a first frame group is combined in the time direction with the decompressed decoded data of a second frame group, which is a frame group continuous with the first frame group in time, wherein
   for three frame groups S1, S2 and S3 which are continuous in time, the neural network learns so that errors with respect to values of its intermediate layers become smaller, when a corrected frame group obtained by the correction step from the frame group S1 and the frame group S2 is referred to as R2 and a corrected frame group obtained by the correction step from the frame group S2 and the frame group S3 is referred to as R3, and a frame group in which the frame group S2 and the frame group S3 are concatenated and a frame group in which the frame group R2 and the frame group R3 are concatenated are input to the neural network.

2. The image processing apparatus according to claim 1, wherein the computer program instructions further perform to:
   perform the correction for every other frame group, and for the frame group without correction, the decompressed decoded data of the frame group is used as the corrected frame group.

3. An image processing program for causing a computer to function as the image processing apparatus according to claim 1.

4. An image processing apparatus for performing correction for each frame group including a predetermined number of frames into which video data is divided, the image processing apparatus comprising:
   a processor; and
   a storage medium having computer program instructions stored thereon, wherein the computer program instructions, when executed by the processor, perform:
   for encoded data obtained by compressing the dimensions of the frame group and encoding them, and for decompressed decoded data obtained by decoding the encoded data and decompressing them to the dimensions before encoding, using a learned neural network, a correction step to obtain a corrected frame group by performing a correction in which the decompressed decoded data of a second frame group is combined in the time direction with a decompressed decoded data of a first frame group, which is a frame group previous to the second frame group in time and continuous with the second frame group in time, and a decompressed decoded data of a third frame group, which is a frame group subsequent to the second frame group in time and continuous with the second frame group in time,
   for three frame groups S1, S2 and S3 which are continuous in time, the neural network learns so that errors with respect to values of its intermediate layers become smaller, when decompressed decoded data of the frame groups S1, S2 and S3 are referred as M1, M2 and M3, respectively, and a frame group in which the frame groups S1, S2 and S3 are concatenated and a frame group in which the decompressed decoded data M1, M2 and M3 are concatenated are input to the neural network.

5. An image processing apparatus for performing correction for each partial data group including a predetermined number of partial data elements into which data are divided, the image processing apparatus comprising:
   a processor; and
   a storage medium having computer program instructions stored thereon, wherein the computer program instructions, when executed by the processor, perform to:
   for encoded data obtained by compressing the dimensions of the frame group and encoding them, and for decompressed decoded data obtained by decoding the encoded data and decompressing them to the dimensions before encoding, using a learned neural network, a correction step to obtain a corrected frame group by performing a correction in which the decompressed decoded data of a first frame group is combined in the time direction with the decompressed decoded data of a second frame group, which is a frame group continuous with the first frame group in time, wherein
   for three frame groups S1, S2 and S3 which are continuous in time, the neural network learns so that errors with respect to values of its intermediate layers become smaller, when a corrected frame group obtained by the correction step from the frame group S1 and the frame group S2 is referred to as R2 and a corrected frame group obtained by the correction step from the frame group S2 and the frame group S3 is referred to as R3, and a frame group in which the frame group S2 and the frame group S3 are concatenated and a frame group in which the frame group R2 and the frame group R3 are concatenated are input to the neural network.

6. An image processing method of performing correction for each frame group including a predetermined number of frames into which video data is divided, the image processing method comprising:

for encoded data obtained by compressing the dimensions of the frame group and encoding them, and for decompressed decoded data obtained by decoding the encoded data and decompressing them to the dimensions before encoding, using a learned neural network, obtain a corrected frame group by performing a correction in which the decompressed decoded data of a first frame group is combined in the time direction with the decompressed decoded data of a second frame group, which is a frame group continuous with the first frame group in time, wherein for three frame groups S1, S2 and S3 which are continuous in time, the neural network learns so that errors with respect to values of its intermediate layers become smaller, when a corrected frame group obtained by the correction step from the frame group S1 and the frame group S2 is referred to as R2 and a corrected frame group obtained by the correction step from the frame group S2 and the frame group S3 is referred to as R3, and a frame group in which the frame group S2 and the frame group S3 are concatenated and a frame group in which the frame group R2 and the frame group R3 are concatenated are input to the neural network.

\* \* \* \* \*